(12) United States Patent
Nakajima et al.

(10) Patent No.: US 6,287,209 B1
(45) Date of Patent: Sep. 11, 2001

(54) PROPELLER SHAFT AND METHOD OF PRODUCING THE SAME

(75) Inventors: Tatsuo Nakajima, Iwata; Yukihiro Watanabe, Shizuoka-ken; Kazuhiko Yoshida, Hukuroi; Hitoshi Kodama; Tsuneo Takano, both of Toyohashi, all of (JP)

(73) Assignees: NTN Corporation, Osaka; Mitsubishi Rayon Kabushiki Kaisha, Tokyo, both of (JP)

(*) Notice: Subject to any disclaimer, the term of this patent is extended or adjusted under 35 U.S.C. 154(b) by 0 days.

(21) Appl. No.: 09/487,322

(22) Filed: Jan. 19, 2000

(30) Foreign Application Priority Data

Jan. 28, 1999 (JP) .................................................. 11-020548

(51) Int. Cl.[7] ...................................................... F16C 3/00
(52) U.S. Cl. ............................ 464/181; 464/183; 464/903
(58) Field of Search ................................... 464/181, 183, 464/903; 138/172

(56) References Cited

U.S. PATENT DOCUMENTS

| | | | |
|---|---|---|---|
| 4,173,670 | * | 11/1979 | VanAuken ....................... 138/DIG. 2 |
| 4,932,924 | * | 6/1990 | Lobel ..................................... 464/181 |
| 5,236,018 | * | 8/1993 | Kobayashi et al. ................... 138/172 |
| 5,397,272 | * | 3/1995 | Smiley et al. ......................... 464/181 |
| 5,683,300 | * | 11/1997 | Yasui et al. ........................... 464/181 |
| 5,836,825 | * | 11/1998 | Yamane ................................. 464/181 |

\* cited by examiner

Primary Examiner—Lynne H. Browne
Assistant Examiner—Aaron Dunwoody
(74) Attorney, Agent, or Firm—Arent Fox Kintner Plotkin & Kahn, PLLC (57) ABSTRACT

A propeller shaft has a metal pipe (1) with a joint element (3) joined at an end thereof. A fiber reinforced plastic layer (5) having a thickness that achieves a flexural rigidity satisfying a required natural bending frequency is formed on an outer circumference of the metal pipe (1) satisfying a static torsional strength required as a propeller shaft. The fiber reinforced plastic layer (5) has an interface strength between the reinforcing fiber and the matrix within a range of 20 to 200 MPa as measured by the microdroplet method.

12 Claims, 4 Drawing Sheets

F: Drawing Force l: Embedded Length r: Fiber Radius

PROPELLER SHAFT AND METHOD OF PRODUCING THE SAME

BACKGROUND OF THE INVENTION

1. Field of the Invention

The present invention relates to a propeller shaft for use as a mechanical driving power transmission shaft in an automobile or the like, and a method of producing the same.

2. Description of the Prior Art

A propeller shaft of an automobile conveys the engine power from a transmission to a final reduction gear, and includes an intermediate shaft and joints disposed at both ends of the intermediate shaft. The propeller shaft has a structure adaptable to variations in the length and angle which are caused by change in the relative position between the transmission and the final reduction gear. Conventionally, the joints constituting the propeller shaft and the intermediate shaft are typically made of steel.

In view of flexural rigidity as well as being made of steel as described above, a long propeller shaft is constructed in parts and a bearing or the like is needed for supporting its intermediate portion, so that an improvement is required in terms of weight, costs, and others. Therefore, in order to meet these demands, adoption of a fiber reinforced plastics (hereafter referred to as FRP) is proposed (See, for example, Japanese Laid-open Patent Publications Nos. 53-71422, 55-118831, and 63-199914. In other words, a longer shaft can be produced by forming a hollow FRP shaft having a high flexural rigidity on an outer circumference of a metal shaft, thereby eliminating the need for division and the need for a supporting bearing in the intermediate portion. This hopefully leads to light weight and low costs.

In a proposed example, a pipe made of FRP alone having a high specific strength is adopted. However, its joint portion can hardly be integrally molded with FRP in view of the rigidity and strength. Typically, metal joints are joined to end portions of the FRP. As a joining method, there are proposed a method in which a sleeve of a metal joint is press-fitted into or bonded with an adhesive to an end portion of the FRP pipe or alternatively, after a metal joint is inserted into an FRP pipe, a continuous fiber impregnated with a resin is wound around the FRP pipe together with the joint (See Japanese Laid-open Patent Publication No. 55-118831), and a method in which a fitting portion of a metal pipe is made in a non-circular cross sectional shape, and an end portion of an FRP pipe is heated above a glass transition temperature and caulked onto a fitting portion of the joint (See Japanese Laid-open Patent Publication No. 63-199914).

As another joining method, in order to achieve torque transmission by ensuring strength of a joining portion, joining has been performed by a method allowing a shaft end to have a polygonal cross section, by performing a surface-roughening treatment with a knurl roller on a joining surface at a portion at which a shaft end portion of a hollow shaft is superposed, by caulking a hollow shaft made of FRP, or by press-fitting a metal component into a shaft core portion of a hollow shaft. Further, if an end portion of a hollow shaft made of FRP is joined to a metal component with an adhesive between the two, various measures have been taken to ensure the strength of the joining portion by utilizing both an adhesive and a process such as surface roughening, caulking, or press-fitting.

However, according to these conventional methods, there are various problems in molding, such as difficulty in processing a shaft end portion, a need for increasing the outer diameter for ensuring the strength of the joining portion, or an additional need for taking measures against slipping-off in an axial direction for ensuring reliability.

Caulking a hollow shaft made of FRP or press-fitting a metal component into a shaft core of a hollow shaft involves a serious disadvantage of lack in a long-term reliability caused by decrease in a binding force due to creep or stress relaxation at the FRP portion, leading to possible sliding in a circumferential direction or possible slipping-off in an axial direction.

Further, when one observes the joining portion, torque transmission is performed only by utilizing a contact area between the FRP and the metal component with the help of a frictional force obtained by utilizing a binding force generated at the time of press-fitting as a normal force, or chemical and physical bonding with an adhesive disposed at their interface. In this case, in an attempt to meet an impulsively generated excessive torque, an area of the interface is enlarged as much as possible by increasing the amount of press-fitting, or an elastic deformation amount by press-fitting of the FRP is increased. This leads to problems in joining, such as generation of cracks in the FRP portion during the process or unavoidable creep or stress relaxation when in use.

On the other hand, if a hollow shaft made of FRP is used as a intermediate shaft of a propeller shaft serving as a mechanical power transmission shaft for light weight, improved fuel economy, low cost, improvements in N.V.H. (Noise, Vibration and Harshness) behavior, and the like, there is a need to reduce the outer diameter of the hollow shaft owing to the limited space in the automobile.

Therefore, it is an object of the present invention to provide a propeller shaft having a high reliability in joining and a high rigidity, i.e. a high natural bending frequency, with light weight and low costs in order to meet the aforementioned need for improvements.

SUMMARY OF THE INVENTION

As a technical means for achieving the aforementioned object, the present invention provides a propeller shaft having a metal pipe joined to a joint element, wherein a fiber reinforced plastic is wound around an outer circumference of the metal pipe to form a fiber reinforced plastic layer, and the fiber reinforced plastic layer has an interface strength between the reinforcing fiber and the matrix within a range of 20 to 200 MPa as measured by the microdroplet method.

By bonding the FRP pipe on the outer circumference of the metal pipe to form a composite hollow shaft, the force can be transmitted with a sufficient endurance strength even under a great shear, because the portion involved in joining the shaft end is not made of FRP alone. In other words, a complete and reliable joining method can be performed such as welding or friction welding of the metal pipe to a metal joint component, so that an inconvenience such as sliding in the circumferential direction or slipping-off in the axial direction is not generated at all and a long-term reliability of the joining portion can be obtained.

Figure 4:
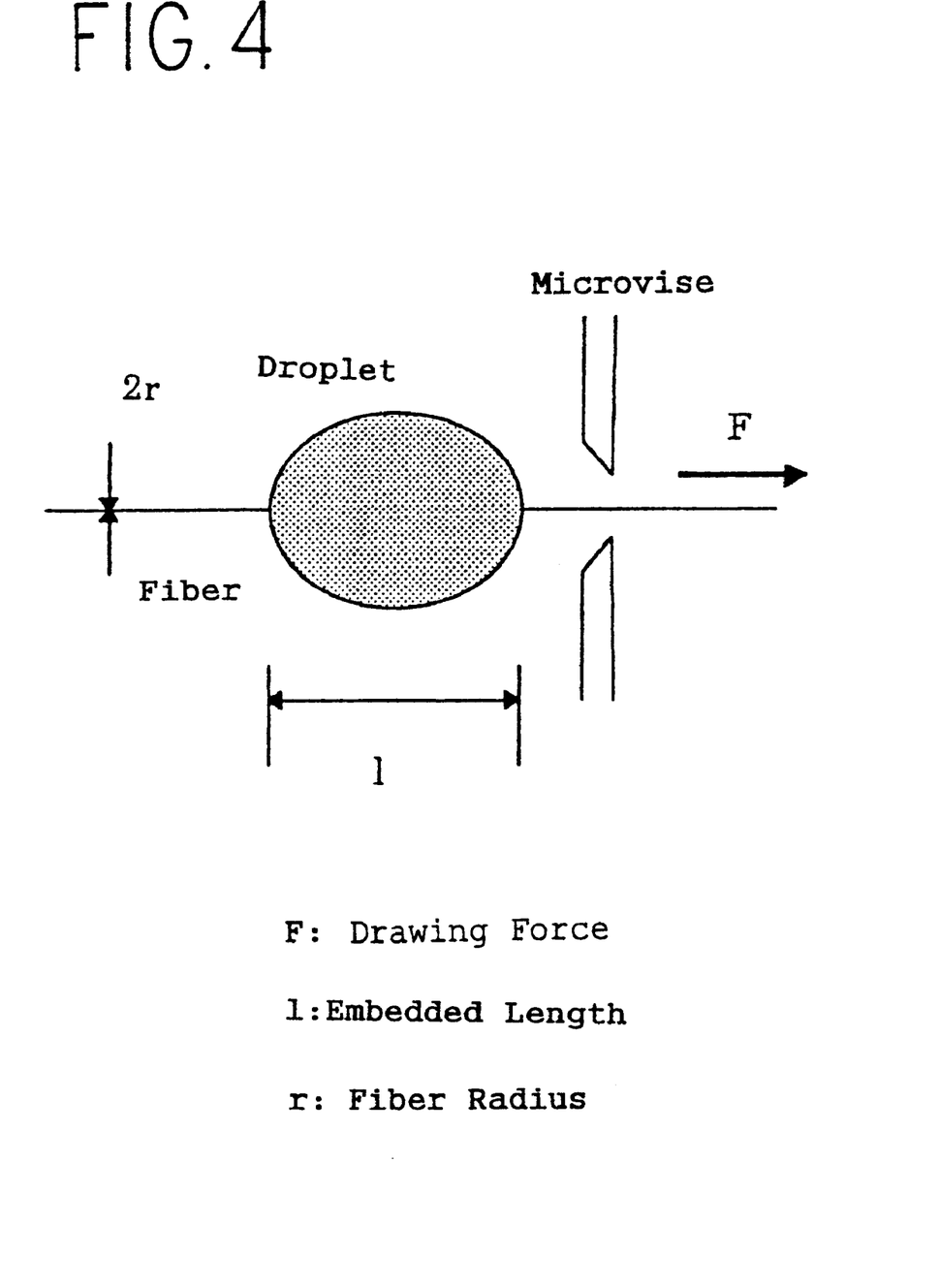
FIG. 4 is a schematic view illustrating a method of measurement according to the microdroplet method.

Further, as described in Japanese Laid-open Patent Publication No 53-71422, by simply using a metal pipe and an FRP pipe in combination as materials, an interfacial exfoliation is generated at an interface between a reinforcing fiber and matrix inside the FRP layer when the composite hollow shaft is deformed by a torque in the circumferential direction, so that it cannot be practically applied to a intermediate shaft of a propeller shaft to be mounted onto a car or the like. Accordingly, an eager study has been made to solve this problem, and as a result, the inventors of the present invention have found out that, if the interface strength between the reinforcing fiber and the matrix inside the FRP material is within a range of 20 MPa to 200 MPa as measured by the microdroplet method, it is advantageous as a intermediate shaft of the propeller shaft to be mounted onto a car or the like. If the interface strength between the reinforcing fiber and the matrix is lower than 20 MPa, interfacial exfoliation is generated at an interface between the reinforcing fiber and the matrix inside the FRP layer when the composite hollow shaft is deformed in accordance with a circumferential torque of about 30 kgf·m typically acting on a car or the like. In other words, if the composite hollow shaft is used under a repeated torque typically acting in a car or the like, it is not possible to maintain a desired rigidity of the composite hollow shaft portion constructed with the metal pipe and the FRP layer. On the other hand, if one wishes to increase the interface strength between the reinforcing fiber and the matrix to be larger than 200 MPa, a special surface treatment on a fiber surface must be employed in combination with special matrix, making its production difficult. The microdroplet method is illustrated in FIG. 4. The microdroplet method are made, for example, by means of a composite material interfacial property evaluation apparatus HM-410 manufactured by Toei Sangyo Co., Ltd.

The inner diameter and the thickness of the composite hollow shaft portion made of the metal pipe and the FRP layer are determined by the first critical speed of rotation required in the propeller shaft. In other words, if one attempts to meet the required the first critical speed of rotation by a metal pipe alone, it will have a large diameter and a large weight. On the other hand, if a propeller shaft is produced by designing the inner diameter, the thickness, and the length of a metal pipe prepared in advance to meet only the static torsional strength required in the propeller shaft, and by winding an FRP layer having a large specific modulus of elasticity onto an outer circumference portion of the metal pipe up to a thickness that achieves a flexural rigidity satisfying the required the first critical speed of rotation, then the outermost diameter and the weight can be reduced. For example, the static torsional strength of the metal pipe is set to be not less than 100 kgf·m, and the first critical speed of rotation of the propeller shaft in modal analysis is set to be not less than 4000 rpm.

The axial length of the FRP layer wound around onto the metal pipe is preferably such that a value of FL/PL is within a range from 0.1 to 1.0, assuming the length of the metal pipe to be PL and the axial length of the FRP layer to be FL. If the value of FL/PL is smaller than 0.1, it is difficult to achieve a flexural rigidity that satisfies the required the first critical speed of rotation even if an FRP layer having a high modulus of elasticity is wound around. If the value of FL/PL is larger than 1.0, it is not preferable because the FRP layer expected to improve the flexural rigidity will be longer than the metal pipe, i.e. a superfluous FRP layer will be formed in the improvement of the flexural rigidity of the metal pipe. Here, since the metal pipe constitutes the intermediate shaft of the propeller shaft, the length thereof is preferably within a range from 10 mm to 3000 mm, more preferably from 100 mm to 3000 mm. If the length is smaller than 10 mm, it leads to a disadvantage that a prepreg constituting a 0° layer is not wound well onto the metal pipe, whereas if the length is larger than 3000 mm, the assembling work into the car will be difficult even if it is used in trucks or the like.

The outer diameter of the metal pipe is preferably within the range from 10 mm to 250 mm, more preferably from 15 mm to 230 mm, most preferably from 20 mm to 200 mm. If the outer diameter is smaller than 10 mm, the transmitted torque will be unsatisfactory as a propeller shaft to be used in an automobile even if an FRP layer is formed on the outer circumference portion. If the outer diameter is larger than 250 mm, a problem arises such as interference with other components for passenger cars.

The thickness of the metal pipe is preferably within the range from 1 mm to 10 mm. If the metal pipe has a thickness smaller than 1 mm, there will be a fear that the metal pipe is broken in transporting the metal pipe or in molding the FRP layer. Also, it will be difficult to design the inner diameter and the thickness of the metal pipe to satisfy only the static torsional strength required in propeller shafts for passenger car and, even if it could be designed, the pipe diameter would be large. If the thickness of the metal pipe is thicker than 10 mm, the propeller shaft will be too heavy for use in an automobile, thus failing to achieve the aforementioned object of light weight.

Further, assuming the thickness of the metal pipe to be $t_1$ and the thickness of the FRP layer to be $t_2$, the value of $t_2/t_1$, is preferably within a range from 0.01 to 10. If the value of $t_2/t_1$ is smaller than 0.01, it is difficult to achieve a flexural rigidity that satisfies the required the first critical speed of rotation even if an FRP layer having a large modulus of elasticity is wound. If the value of $t_2/t_1$ is larger than 10, the period of time for curing the thermoset resin will be long in the process; the production costs will be large; and problems arise in terms of mass production or the like, although an improvement in the flexural rigidity can be expected by winding the FRP layer.

The fiber orientation angle of the FRP constituting a laminate on the outer circumference portion of the metal pipe is preferably 0°, 90°, ±45°, or a combination of these relative to the axial direction of the metal pipe, in view of tuning the flexural rigidity and the torsional rigidity and preventing a buckling. At this time, the flexural rigidity and the torsional rigidity can be tuned also by suitably combining the FRP layers in accordance with the first critical speed of rotation and the torque acting on the propeller shaft. With the use of a prepreg sheet in a semi-hardened state in which fibers are impregnated with a thermosetting resin, a lamination process can be carried out in a stable manner while maintaining the arrangement of filament constantly in one direction, and also the prepreg can be wrapped at an arbitrary fiber orientation angle. The flexural rigidity, the torsional rigidity, and the buckling resistance may be controlled also by the thickness of the FRP layer obtained by laminated the prepreg, the thickness ratio of the metal pipe to the FRP layer, the width of the FRP layer, and the modulus of elasticity with the prepreg, (the type of the fiber, the fiber content, the prepreg thickness).

The thickness of the prepreg wound around the outer circumference is preferably within a range from 5 μm to 600 μm. If the thickness of the prepreg is smaller than 5 μm, wrinkles are liable to be generated in the wrapping process and, when a torque is applied to the composite hollow shaft, the wrinkled portion may possibly be a starting point of cracks. If the thickness of the prepreg is larger than 600 μm, it is difficult to wind it due to its thickness and, even if it is wound, there will be a comparatively large difference in level in the appearance of the composite hollow shaft. This difference in level may possibly make it difficult to keep a balance if it is used as a intermediate shaft of a propeller shaft.

The fiber constituting the laminate portion is preferably made of a material having a small density and a high modulus of elasticity in order to increase the first critical speed of rotation of the propeller shaft. Examples of such a fiber include PAN-based carbon fibers, pitch-based carbon fibers, silicon nitride fibers, alumina fibers, boron fibers, glass fibers, para-based aramid (for example, Kevlar® manufactured by Dupont Co., Ltd.) fibers, and metal (steel, aluminum alloy, titanium alloy, copper, tungsten) fibers. The tensile modulus of the reinforcing fiber is preferably not less than 20000 kgf/mm$^2$ (196 GPa), more preferably not less than 25000 kgf/mm$^2$ (245 GPa). If the tensile modulus is smaller than 20000 kgf/mm$^2$ (196 GPa), the first critical speed of rotation of the propeller shaft cannot be increased no matter how the fiber orientation angle of the FRP is constructed.

If a PAN-based carbon fiber is used, its filament diameter is preferably within a range from 1 $\mu$m to 20 $\mu$m, more preferably from 5 $\mu$m to 8 $\mu$m. If the filament diameter of the PAN-based carbon fiber is less than 1 $\mu$m, then the cost of an acrylic fiber as a source material will be expensive and the control will be difficult in processing into the carbon fiber by firing, thereby increasing the price of the fiber and making it impossible to establish a low-cost shaft. On the other hand, if the filament diameter of the PAN-based fiber exceeds 20 $\mu$m, it is not possible to produce a prepreg for use by the sheet wrapping method.

For further reduction in costs, two or more different types of fibers may be used in combination. A fiber having a larger specific modulus of elasticity produces a larger effect in weight reduction and hence is preferable for use in a propeller shaft. In other words, in terms of specific strength, the PAN-based carbon fiber is suitable, whereas in terms of specific modulus of elasticity, the pitch-based carbon fiber is suitable. However, in view of reducing the costs, it is possible to use these two types of carbon fibers in combination or a hybrid of these carbon fibers and a glass fiber.

These fibers may be either in a tow-form or in a prepreg-form. However, in the case of the tow-form, the fiber is molded to have a small thickness and a large diameter by the filament winding method or the pultrusions while dipping it in an uncured matrix resin. In the case of the prepreg-form, the resin sheet is molded to have a small thickness and a large diameter by the sheet wrapping (pipe winding) method. If the sheet wrapping method is used, it is possible to use a table rolling sheet wrapping apparatus that performs increased clamping by table rolling, or a roller-type sheet wrapping apparatus that winds a prepreg around a core rod (mandrel) by disposing the mandrel on a roller. Further, depending on the shape and the manufacturing, a molding method such as pultrusions can be adopted. A combination of two or more of these methods may be employed for molding.

If the laminate is to be formed by a combination of FRP layers whose fiber orientation angles are 0°, 90°, and ±45° relative to the axial direction, the sheet wrapping method using a prepreg is suitable, and it is comparatively difficult to form a layer having a fiber orientation angle of 0° by the filament winding method. By pultrusions, it is comparatively difficult to form a layer having an orientation angle of 90°. The fiber sheet constituting the prepreg used in the sheet wrapping method may be a cloth in a state of being woven in cross directions instead of one direction.

The thermoset resin to be used as a matrix for impregnation is not specifically limited. Typically, it is possible to use an epoxy resin, a phenolic resin, an unsaturated polyester resin, a vinyl ester resin, a urethane resin, an alkyd resin, a xylene resin, a melamine resin, a furan resin, a silicone resin, a polyimide resin, and others exhibiting a thermosetting property. However, in view of strength, an epoxy resin is preferable. If an epoxy resin is used as a matrix, the heat resistance after epoxy curing is preferably not less than 60°, more preferably not less than 80°, as a glass transition temperature. Since the ambient temperature of the propeller shaft used as a mechanical power transmission shaft of an automobile is about 60°, there will possibly be a serious problem such as destruction and the resin cannot be used as a matrix if the heat resistance after epoxy curing is less than 60°.

Further, it is possible to use a modified epoxy resin imparted with an impact strength by forming partide dispersion (=island) structure where rubber particles are disposed in the epoxy resin, or a denatured epoxy resin in which a main chain or a side chain is denatured as a chemical structure. In this case, damping property can be imparted to the obtained propeller shaft structure. Also, it is possible to use an epoxy resin imparted with electrical conductivity by dispersing an electrically conductive filler such as carbon black or a metal powder in the epoxy resin.

Furthermore, the interface strength between the matrix and the fibers can be improved by performing a surface activation treatment on a fiber surface by an ozone oxidation process or ultraviolet radiation, by performing a wet treatment with the use of a silane coupling agent or a titanium coupling agent to improve affinity, or by forming a functional group site having a high reactivity on the fiber surface to impart a strong adhesion having a chemical bond with the thermoset matrix resin after curing.

Further, Japanese Laid-open Patent Publication No. 55-15801, for example, discloses an example in which a carbon fiber prepreg and a glass fiber cloth are wound around a aluminum pipe before molding. In this case, however, a adhesion layer is needed for integration with the metal pipe. If the FRP layer has a circumferential thermal expansion coefficient less than that of the metal pipe, i.e. in a clamping direction in an ordinary use as in the present invention, the adhesion layer will be unnecessary, so that it will be further advantageous for integration. Also, in order to prevent destruction of the FRP layer by an excessive clamping force, the thermal expansion coefficient is preferably within the circumferential strength of the layer. The inventors of the present invention have made an eager study in this respect and have found out that, if a steel pipe is used as the metal pipe, the thermal expansion coefficient of the FRP layer in the circumferential direction of the shaft as measured by the thermal mechanical analyzer (TMA) method is preferably within the range from 1 mm/mm/° C. to 11 mm/mm/° C. In other words, if the thermal expansion coefficient in the circumferential direction of the shaft is smaller than 1 mm/mm/° C., an excessive clamping force is generated to destroy the FRP layer owing to the relative circumferential thermal expansion coefficient difference to the steel pipe caused by the temperature change under an environment in which it is used as a propeller shaft. On the other hand, if the thermal expansion coefficient is larger than 11 mm/mm/° C., a partial exfoliation may possibly be generated in the interface between the steel pipe and the FRP layer owing to the relative circumferential thermal expansion coefficient difference to the steel pipe caused by the temperature change under an environment in which it is used as a propeller shaft.

The measurements according to the TMA method are made, for example, by means of a mechanical thermal analyzer 943 type manufactured by Dupont Co., Ltd.

Also, the inventors of the present invention have found out that, if an aluminum pipe is used as the metal pipe, the thermal expansion coefficient of the FRP layer in the circumferential direction of the shaft as measured by the TMA method is preferably within the range from 1 mm/mm/° C. to 29 mm/mm/° C. In other words, if the thermal expansion coefficient in the circumferential direction of the shaft is smaller than 1 mm/mm/° C., an excessive clamping force is generated to destroy the FRP layer owing to the relative circumferential thermal expansion coefficient difference to the aluminum pipe caused by the temperature change under an environment in which it is used as a propeller shaft. On the other hand, if the thermal expansion coefficient is larger than 29 mm/mm/° C., a partial exfoliation may possibly be generated in the interface between the aluminum pipe and the FRP layer owing to the relative circumferential thermal expansion coefficient difference to the steel pipe caused by the temperature change under an environment in which it is used as a propeller shaft.

Here, in these cases, it goes without saying that the FRP layer and the metal pipe can be integrated even if the reinforcing fiber of the FRP layer is a single one or a combination of two or more selected from PAN-based carbon fibers, pitch-based carbon fibers, glass fibers, silicon nitride fibers, alumina fibers, boron fibers, para-based aramid (for example, Kevlar® manufactured by Dupont Co., Ltd.) fibers, and metal (steel, aluminum alloy, titanium alloy, copper, tungsten) fibers.

Furthermore, as described in the paper: Durk Hyun Cho and Dai Gil Lee, Composite Structures, Vol. 38, No. 1–4, pp. 309–319, 1997 (Elsevier Science Ltd.), if a curing treatment is performed after winding a carbon fiber around an aluminum pipe, a practical problem may possibly be raised such that a compression stress remains in the axial direction in the carbon fiber during cooling after cure owing to the difference in the thermal expansion coefficient between the aluminum pipe and the carbon fiber prepreg. In order to solve this problem, the paper reports a technique of relaxing the residual compression stress generated in the carbon fiber after cure by using a jig to compress the aluminum pipe in advance in the axial direction before winding the carbon fiber for utilizing the cancellation of the amount of return of elastic deformation in the compression direction and the change in the axial dimension by thermal shrinkage when the jig is dismounted after cooling. In the present invention, the inventors have found out that, for relaxing of the axial residual stress in the FRP layer after cure, the laminate structure of FRP materials preferably has a two-layer structure including a 0° layer and a 90° layer relative to the axial direction of the metal pipe, and the ratio of the circumferential direction layer (90° layer) is preferably within the range from 1% to 20%. If the ratio of the circumferential direction layer (90° layer) is less than 1%, the value of the thermal expansion coefficient in the circumferential direction of the shaft cannot be controlled to be 11 mm/mm/° C. or less. On the other hand, if the ratio of the circumferential direction layer (90° layer) is larger than 20%, the thickness of the laminate portion will be thick for imparting a flexural rigidity in the fiber construction of the FRP layer having a two-layer structure including the 0° layer and the 90° layer, thereby leading to lack in rationality from the viewpoint of economy and light weight.

In the case where the FRP layer is formed of a single layer, the present invention can be rationally put into practice if the fiber orientation angle relative to the axial direction of the metal pipe is within a range from +5° to +30° or from −30° to −5°. In other words, if the fiber orientation angle relative to the axial direction of the metal pipe is less than ±5°, the value of the thermal expansion coefficient in the circumferential direction of the shaft cannot be controlled to be 11 mm/mm/° C. or less, and also cracks are liable to be generated (=occurred) owing to the residual stress in the laminate portion of the FRP material in the axial direction in the molding process. On the other hand, if the fiber orientation angle is larger than ±30°, the thickness of the FRP layer portion will be thick if a desired rigidity is to be established in the composite hollow shaft portion constructed by the metal pipe and the FRP layer, thereby leading to lack in rationality from the viewpoint of economy and light weight. Here, it goes without saying that, if the value of the thermal expansion coefficient of the FRP layer portion in the circumferential direction of the shaft is not more than 11 mm/mm/° C., problems such as exfoliation at the interface between the FRP layer and the steel pipe or even the aluminum pipe are not raised.

Such a laminate structure of the FRP, if molded for example by the sheet wrapping method, can be molded by arranging a plurality of prepreg sheets, which are cut in advance into a predetermined shape, in series for sheet wrapping so that a layer having a planned fiber orientation angle may be formed in the laminate structure after wrapping and curing. In the case of the filament winding method or pultrusion, the laminate structure of the FRP material can be molded by winding and curing tows, which are dipped in an uncured matrix resin, in series so that a layer having a planned fiber orientation angle may be formed in the laminate structure after winding and curing. Also, the sheet wrapping method, the filament winding method, and the pultrusion can be used in a suitable combination for molding.

The kind of the metal in the metal pipe on which the prepreg is wound is not specifically limited as long as it is a metal that can be subjected to a mechanical process such as drilling, a welding process, a friction welding process, or a press-fitting process. Preferable metals for use include iron, aluminum, copper, titanium, tungsten, and nickel. An alloy of any of these metals may be used as well.

A metal joint element can be joined to an end of the metal pipe by a pinning process, a welding process, a friction welding process, or a press-fitting process and, by using this as a mandrel, a prepreg can be wound by the sheet wrapping method for molding. In this case, the filament winding method can be employed for molding. Conversely, a prepreg can be wound around the metal pipe in advance for molding by the sheet wrapping method, and then a metal joint element can be joined by a pinning process, a welding process, a friction welding process, or a press-fitting process to fabricate a intermediate shaft portion. Alternatively, a intermediate shaft portion with light weight can be fabricated by fabricating a serration side of a stub (yoke) portion of a joint element using a metal in advance, fabricating a stub by friction welding so that the joining side with the hollow shaft is made of aluminum, and welding the aluminum hollow shaft with the aluminum side of the stub.

A method of producing a propeller shaft according to the invention is characterized by the step of forming a fiber reinforced plastic layer having a thickness that achieves a flexural rigidity satisfying a required natural bending frequency is formed on an outer circumference of a metal pipe satisfying a static torsional strength required as a propeller shaft. Specifically, with the metal pipe being used as a mandrel after sanding and degreasing, a fiber reinforced plastic layer is formed on an outer circumference of the shaft. A heat shrinkage tape or film is wound around the fiber reinforced plastic layer, which is then cured to produce a composite hollow shaft. The shaft thus produced may be used after the shrinkage tape or film is removed. Alternatively, the shrinkage tape or film may be lest as is. An outer surface of the shaft may be coated with a suitable paint, whether or not the shrinkage tape or film exists.

BRIEF DESCRIPTION OF THE DRAWINGS

The above and further objects and features of the invention will more fully be apparent from the following detailed description with accompanying drawings, in which.

DETAILED DESCRIPTION OF THE INVENTION

Hereafter, embodiments of the present invention will be described in detail with reference to examples thereof illustrated in the attached drawings. However, the present invention is in no way limited by these examples.

Figure 1:
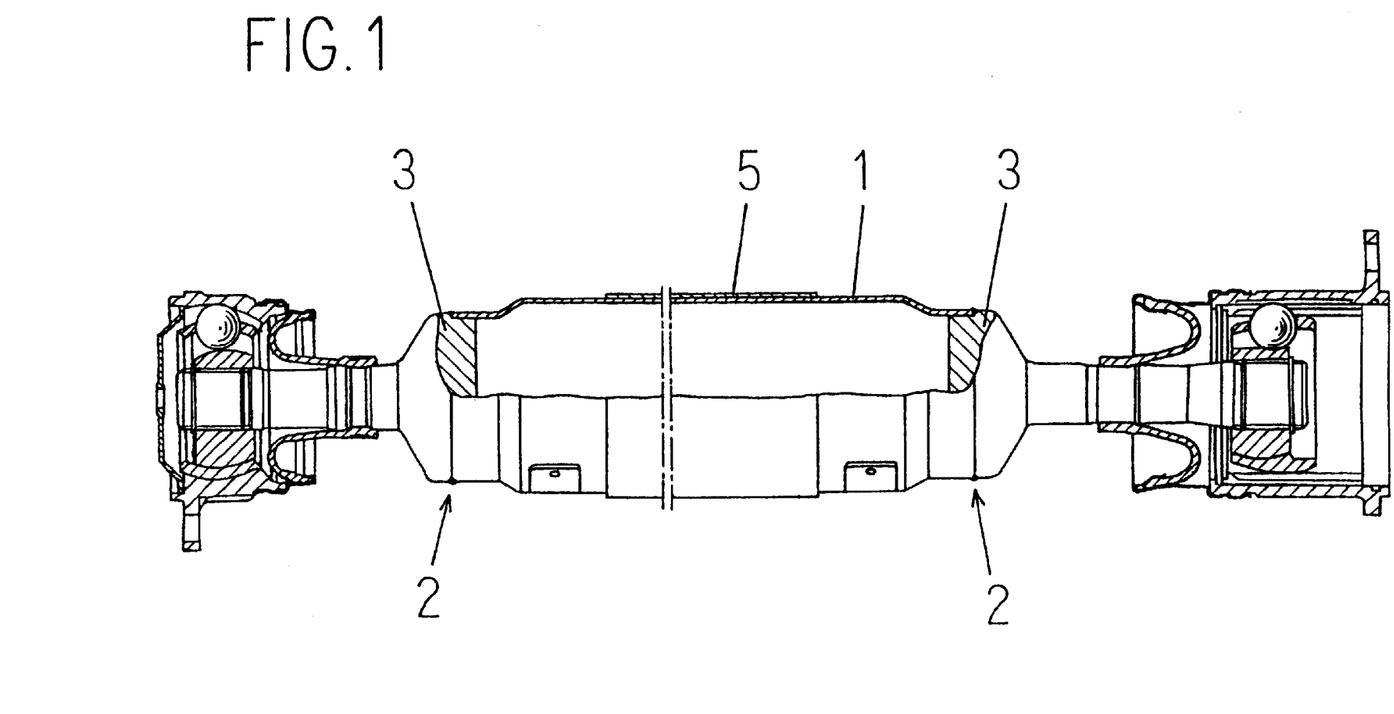
FIG. 1 is a semi-sectional view illustrating a propeller shaft with joints at both ends.
Figure 2:
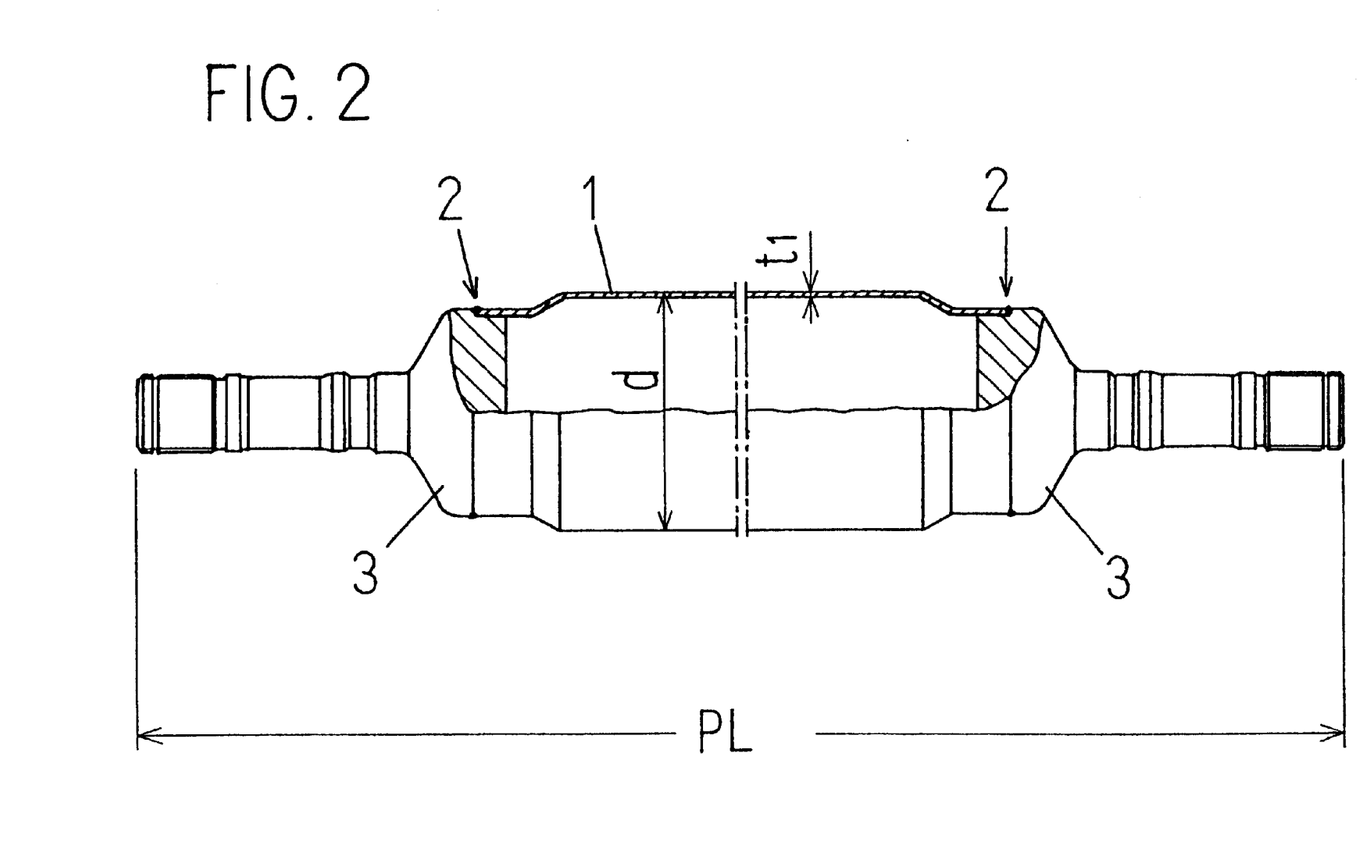
FIG. 2 is a semi-sectional view illustrating a hollow metal shaft.

FIG. 1 shows a view exemplifying a propeller shaft of an automobile with joints at both ends thereof, where the FRP layer is designated by the reference numeral 5. FIG. 2 is a view illustrating a metal hollow shaft as a core. Here, metal joint elements, i.e. stubs 3 in this case, are welded to both ends of a steel pipe (STKM13B material) 1 tapered towards the ends, at joining portions 2 as illustrated. The dimensions of the metal hollow shaft in this case are as follows:

Total length: PL=1600 mm

Width of wound FRP portion: FL=1240 mm (See FIG. 3)

Thickness: $t_1$=1.6 mm

Outer diameter: d=65 mm

Figure 3:
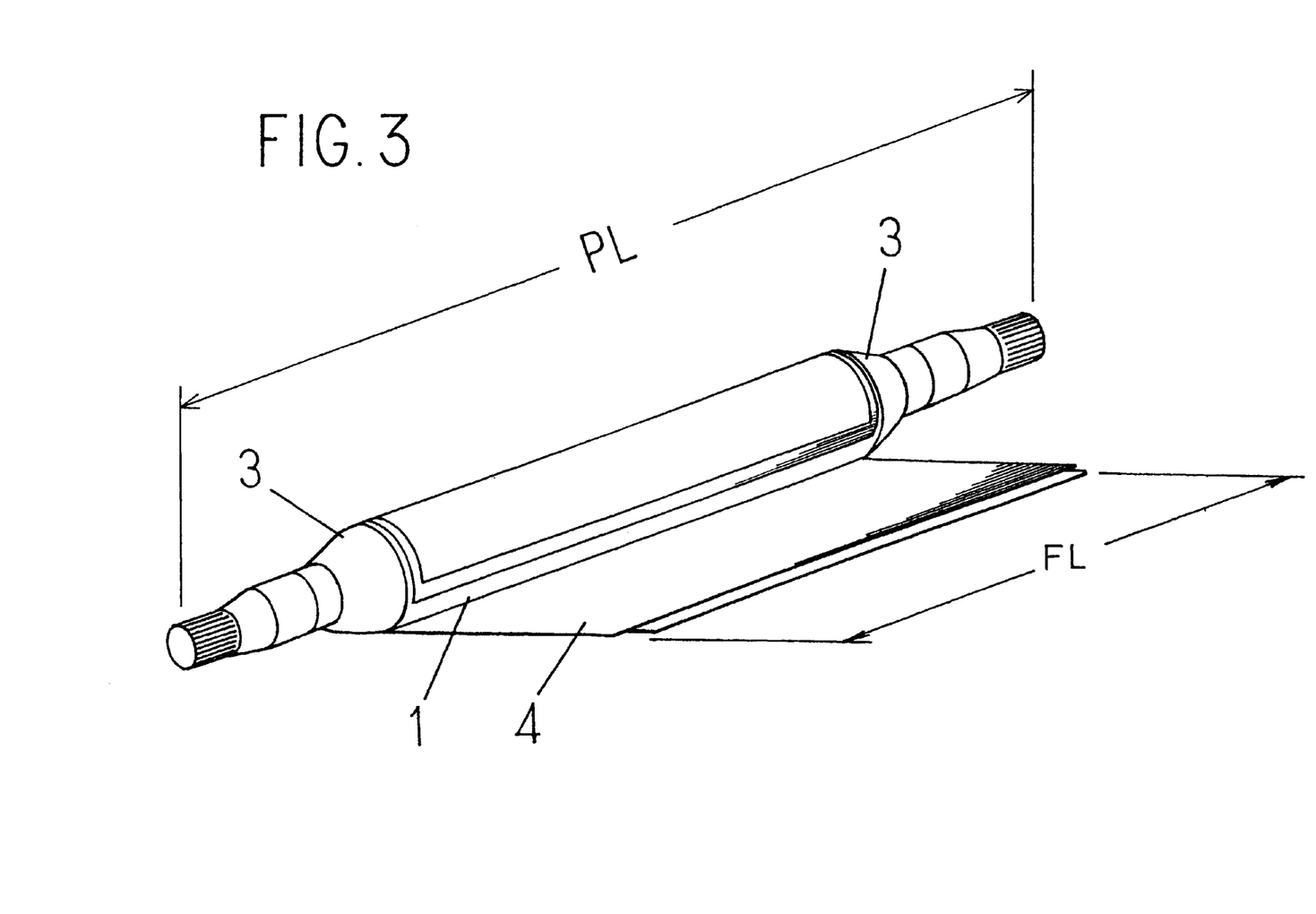
FIG. 3 is a perspective view illustrating a step of wrapping a prepreg.

The strength of the metal hollow shaft was measured by means of a static torsion tester. The criterion was set to be 100 kgf·m or more in the static torsional strength. The employed static torsion tester was a static torsion tester RTE-1000 manufactured by Tokyo Kouki Seizousho Co., Ltd. Thereafter, the metal hollow shaft was used as a mandrel and, after sanding and degreasing, two PAN-based carbon fiber prepregs 4 of an epoxy resin matrix stacked in advance were wound around the outer circumferential portion to a predetermined thickness (2±0.1 mm) by the sheet wrapping method, as illustrated in FIG. 3. Here, the above-mentioned prepregs were a 0° layer prepreg having a thickness of 250 μm and a 90° layer prepreg having a thickness of 5 μm, both of which were made of a PYROFIL® Prepreg (registered trademark of Mitsubishi Rayon Co., Ltd.) having a resin content of 35 wt % with a modulus of elasticity with the PAN-based carbon fiber being 26×103 kgf/mm². The orientation angles of the carbon fibers were set to be 0° and 90° relative to the axial direction; the laminate structure was 0°/0°/[90°/0°]$_n$ (n being a winding number to achieve a predetermined thickness); and the thermal expansion coefficient in the circumferential direction of the shaft was set to be within the range from 1 mm/mm/° C. to 11 mm/mm/° C. as measured by the TMA method. A provisional fixation was performed by winding a heat-shrinkage tape or film thereon, followed by a curing treatment at 150° C. for two hours to produce a composite hollow shaft (See FIG. 1).

With respect to the obtained composite hollow shaft, evaluation of appearance by presence or absence of cracks and measurement of natural bending frequency by modal analysis were carried out. The criterion was set to be 66.7 Hz or more in the natural bending frequency (i.e. 4000 rpm or more in the first critical speed of rotation).

Table 1 shows test results on the static torsional strength of the metal pipe and the first critical speed of rotation of the composite hollow shaft with respect to Examples 1to 16 in which the properties of the metal pipe (material, diameter, and thickness of the metal pipe) and the properties of the FRP layer (thickness and lamination structure) are varied. The test results are shown by the symbols ○ and x for pass and fail, respectively. Examples 1 to 16 all passed the tests. None of the samples showed a problem in appearance such as cracks.

TABLE 1

| Example No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Properties of metal pipe | | | | | | | | | | | | | | | | |
| Metal | | | | | | Fe | | | | | | | Al | | | |
| Pipe diameter (outer diameter), mm | | | 05 | | | | 75 | | 70 | 80 | 90 | 60.8 | | 85 | | 75 | 70 | 60 |
| Thickness, mm | | | | 1.6 | | | | | 1.0 | | | 1.8 | 2.3 | 1.6 | 2.3 | 2.5 | | 2.5 |
| Fiber reinforced plastic layer | | | | | | | | | | | | | | | | |
| Thickness, mm | | | 2 | | | | | 1 | | | 3 | 1 | | | 2 | | |
| Laminate construction | A | B | C | A | B | C | D | A | A | A | B | D | C | E | E | E |
| Pass or fail in static torsional strength of metal intermediate shaft pass: ○, fail: x | ○ | ○ | ○ | ○ | ○ | ○ | ○ | ○ | ○ | ○ | ○ | ○ | ○ | ○ | ○ | ○ |
| Pass or fail in the first critical speed of rotation of composite FRP intermediate shaft pass: ○, fail: x | ○ | ○ | ○ | ○ | ○ | ○ | ○ | ○ | ○ | ○ | ○ | ○ | ○ | ○ | ○ | ○ |

Here, in Table 1, "Fe" and "Al" in the rank of "metal" specifically represents the STKM13B material and the AL6061 material, respectively. The symbols "A" to "F" in the rank of the lamination construction of the FRP layer represent the following. Here, the numeral n represents the number of repetition (=winding number) till a predetermined thickness is achieved.

A: 0°/0°/[90°/0°]$_n$ from the pipe side

B: [0°/90°/0°]$_n$ from the pipe side

C: [0°/G]$_n$ from the pipe side

D: [0°/CC]$_n$ from the pipe side

E: monolayer structure having only a +30° layer

F: monolayer structure having only a 0° layer (Table 2)

Details of the prepreg of each layer are as follows.

0° layer: CFRP prepreg (thickness: 250 μm)
30° layer: CFRP prepreg (thickness: 250 μm)
90° layer: CFRP prepreg (thickness: 50 μm)
G layer: glass cloth prepreg (thickness: 50 μm)
CC layer: CFRP cloth prepreg (thickness: 50 μm)

were generated in the FRP layer after molding, not to mention the judgement of pass or fail in the first critical speed of rotation.

TABLE 2

| Comparative Example No. | 1 | 2 | 3 | 4 | 5 | 6 | 7 | 8 | 9 | 10 |
|---|---|---|---|---|---|---|---|---|---|---|
| Properties of metal pipe | | | | | | | | | | |
| Metal | Fe | Fe | Fe | Fe | Fe | Fe | Al | Al | Al | Al |
| Pipe diameter (outer diameter), mm | | | 65 | 65 | 75 | 75 | 65 | 65 | 65 | 75 |
| Thickness, mm | 0.5 | 0.8 | 0.8 | 1.0 | 1.6 | 1.6 | 0.8 | 1.0 | 1.6 | 2.8 |
| Fiber reinforced plastic layer | | | | | | | | | | |
| Thickness, mm | — | — | 2 | 2 | 2 | 2 | | | 2 | 2 |
| Laminate construction | | | | F | | | | | F | |
| Pass or fail in static torsional strength of metal intermediate shaft pass: ○, fail: x | x | ○ | ○ | ○ | ○ | ○ | x | x | ○ | ○ |
| Pass or fail in the first critical speed of rotation of composite FRP intermediate shaft pass: ○, fail: x | — | x | — | — | — | — | — | — | — | — |
| Appearance of fiber reinforced plastic layer | | | Cracks were generated after molding | Cracks were generated after molding | Cracks were generated after molding | Cracks were generated after molding | | | Cracks were generated after molding | Cracks were generated after molding |

Since the composite hollow shaft of Examples 1 to 16 underwent curing with the shrinkage tape thereon as described previously, the shrinkage tape forms the outermost layer of the composite hollow shaft. No coating layer is provided since the FRP layer is rust-proof and corrosion free. However, as will be apparent from the following Examples, the shrinkage tape may be removed before the shaft is put in use, and yet, the shaft may be coated with a suitable paint, whether or not the shrinkage tape exists.

A shaft of Example 17 was prepared by removing the shrinkage tape from the shaft of Example 4. The first critical speed of rotation for the shaft of Example 17 was measured and proved to be above criterion of 4000 rpm.

A shaft of Example 18 was prepared by coating the shaft of Example 4 with a water soluble paint, EMULTER2000 manufactured by Aishin Kakou Co., Ltd. The first critical speed of rotation for the shaft of Example 18 was measured and proved to be above the criterion of 4000 rpm.

A shaft of Example 19 was prepared by coating the shaft of Example 4 with a water soluble paint, EMULTER2000 manufactured by Aishin Kakou Co., Ltd., after the shrinkage tape is removed. The first critical speed of rotation for the shaft of Example 19 was measured and proved to be above the criterion of 4000 rpm.

Next, Table 2 shows test results on Comparative Examples 1 to 10. Comparative Examples 1, 2, 7, and 8 are for metal hollow shafts constructed only with a metal pipe, whereas Comparative Examples 3 to 6, 9, and 10 are for composite hollow shafts including an FRP layer having a thickness of 2 mm. The FRP layer of the after has a monolayer structure with only a 0° layer, and each is molded by the sheet wrapping method. As will be apparent from Table 2, the test results for Comparative Examples 1 to 10 were all fails. Namely, Comparative Examples 1, 7, and 8 showed fails in the static torsional strength. Comparative Example 2 did not satisfy the criterion set for composite hollow shafts (83.3 Hz in the natural bending frequency). Comparative Examples 3 to 6, 9, and 10 showed passes in the static torsional strength of the metal pipe, but cracks were generated in the FRP layer after molding, not to mention the judgement of pass or fail in the first critical speed of rotation.

As will be apparent from the above descriptions, since a strong welding process having a high reliability in a long-term use can be utilized for joining a composite hollow shaft with a joint element, the propeller shaft of the present invention can be used also as a shaft for constant-velocity joint for automobiles, and also can be suitably used as a shaft for mechanical power transmission for use in ships, industrial machines, and aircraft as well as automobiles.

According to the method of producing a propeller shaft of the present invention, a light and compact propeller shaft having a reliability in torsional strength and joining strength for automobiles can be obtained. Further, since a metal pipe constituting a core material serves as a mandrel, the need for a mandrel-drawing operation after molding and a process of joining with a metal joint element is eliminated. Typically, in the case where an FRP prepreg is wrapped for molding, a shrinkage film or tape is often wound around an outermost layer for provisional fixation of the prepreg at the time of curing, and the shrinkage film or tape is peeled off after the hardening to produce a final product. By application of the present invention, the shrinkage film or tape serves as a protective film for the propeller shaft against chippings, so that the shrinkage film or tape can be used without being peeled off. This reduces the number of processing steps and eliminates the waste of materials.

In the case where a steel pipe is used, coating is required for prevention of rusts and for giving a resistance against chippings. In the present invention, the outermost FRP layer serves as a coating film for prevention of rusts and corrosion resistance, thus eliminating the need for coating process on that portion after molding. In other words, the propeller shaft can be produced at lower costs.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A propeller shaft having a metal pipe joined to a joint element, wherein a fiber reinforced plastic is wound around an outer circumference of the metal pipe to form a fiber reinforced plastic layer, and said fiber reinforced plastic layer has an interface strength between the reinforcing fiber and a matrix within a range of 20 to 200 Mpa as measured by a microdroplet method.

2. A propeller shaft according to claim 1, wherein the metal pipe has a static torsional strength of not less than 100 kgf·m, and the propeller shaft has the first critical speed of rotation of not less than 4000 rpm in modal analysis.

3. A propeller shaft according to claim 1, wherein a value of FL/PL is within a range from 0.1 to 1.0, assuming that the metal pipe has a length of PL and the fiber reinforced plastic layer has an axial length of FL.

4. A propeller shaft according to claim 1, wherein a value of $t_2/t_1$ is within a range from 0.01 to 10, assuming that the metal pipe has a thickness of $t_1$, and the fiber reinforced plastic layer has a thickness of $t_2$.

5. A propeller shaft according to claim 1, wherein a reinforcing fiber in the fiber reinforced plastic layer has a tensile modulus of not less than 20000 kgf/mm$^2$.

6. A propeller shaft according to claim 1, wherein a reinforcing fiber in the fiber reinforced plastic is a PAN-based carbon fiber having a filament diameter within a range from 1 $\mu$m to 20 $\mu$m.

7. A propeller shaft according to claim 1, wherein the fiber reinforced plastic layer has a thermal expansion coefficient within a range from 1 to 29 mm/mm/° C. in a circumferential direction of the shaft as measured by a TMA method.

8. A propeller shaft according to claim 1, wherein the fiber reinforced plastic layer has a two-layer structure including a 0° layer and a 90° layer with respect to a fiber orientation angle relative to an axial direction of the metal pipe, and a ratio of the 90° layer is within a range from 1 to 20%.

9. A propeller shaft according to claim 1, wherein the fiber reinforced plastic layer has a monolayer structure, and a fiber orientation angle relative to an axial direction of the metal pipe is within a range of ±5 to 30°.

10. A propeller shaft according to any one of claims 1 to 9, wherein the propeller shaft has an outermost layer of a heat shrinkage tape or film.

11. A propeller shaft according to any one of claims 1 to 9, wherein an outer surface of the propeller shaft is coated.

12. A method of producing a propeller shaft comprising the step of forming a fiber reinforced plastic layer having a thickness that achieves a flexural rigidity satisfying a required natural bending frequency on an outer circumference of a metal pipe satisfying a static torsional strength required as a propeller shaft.

* * * * *